US012304215B2

(12) United States Patent
Maeshima et al.

(10) Patent No.: US 12,304,215 B2
(45) Date of Patent: May 20, 2025

(54) SUB-TANK AND INKJET RECORDING APPARATUS

(71) Applicant: KYOCERA Document Solutions Inc., Osaka (JP)

(72) Inventors: Masanobu Maeshima, Osaka (JP); Noriaki Furukawa, Osaka (JP); Takuma Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 205 days.

(21) Appl. No.: 18/191,805

(22) Filed: Mar. 28, 2023

(65) Prior Publication Data

US 2023/0311534 A1 Oct. 5, 2023

(30) Foreign Application Priority Data

Mar. 29, 2022 (JP) ................................. 2022-052915
Mar. 22, 2023 (JP) ................................. 2023-045269

(51) Int. Cl.
*B41J 2/175* (2006.01)

(52) U.S. Cl.
CPC ....... *B41J 2/17566* (2013.01); *B41J 2/17509* (2013.01); *B41J 2/17596* (2013.01); *B41J 2002/17576* (2013.01)

(58) Field of Classification Search
CPC .... B41J 2/175; B41J 2/17503; B41J 2/17506; B41J 2/17509; B41J 2/17513; B41J 2/17553; B41J 2/17563; B41J 2/17566; B41J 2/17596; B41J 2002/17576
See application file for complete search history.

(56) References Cited

U.S. PATENT DOCUMENTS 10,792,929 B2 10/2020 Maeshima
2013/0187985 A1 * 7/2013 Katoh ...................... B41J 2/175 347/47

FOREIGN PATENT DOCUMENTS

JP 2019-025741 A 2/2019

* cited by examiner

*Primary Examiner* — Anh T Vo
(74) *Attorney, Agent, or Firm* — Studebaker Brackett PLLC

(57) ABSTRACT

A sub-tank is disposed in a flow path from a main tank to a recording head. The sub-tank includes a tank main body, a level sensor and a flow restricting part. In the tank main body, ink replenished from the main tank is contained. The level sensor detects a liquid level of the ink in the tank main body. The flow restricting part restricts flowing of the ink in an upper-and-lower direction in the tank main body. The flow path is connected to the tank main body at a position below the flow restricting part. The flow restricting part is disposed at a position below a lower limit level of the liquid level.

9 Claims, 7 Drawing Sheets

SUB-TANK AND INKJET RECORDING APPARATUS

INCORPORATION BY REFERENCE

This application is based on and claims the benefit of priority from Japanese patent application No. 2022-052915 filed on Mar. 29, 2022 and Japanese patent application No. 2023-045269 filed on Mar. 22, 2023, which is incorporated by reference in its entirety.

BACKGROUND

The present disclosure relates to a sub-tank and an inkjet recording apparatus.

In general, an inkjet recording apparatus which ejects ink on a medium to form an image is known. The inkjet recording apparatus is provided with a sub-tank which adjusts a water head pressure, in addition to a main tank. A liquid level of the ink contained in the sub-tank is detected by a float type level sensor, and when the liquid level is lower than a predetermined level, the ink is replenished from the main tank to the sub-tank. Since the float of the level sensor covers all the liquid surface of the ink contained in the sub-tank, the contact between the liquid surface and air is reduced so that progress of dissolution of the air to the ink is suppressed.

SUMMARY

In accordance with one aspect of the present disclosure, a sub-tank is disposed in a flow path from a main tank to a recording head. The sub-tank includes a tank main body, a level sensor and a flow restricting part. In the tank main body, ink replenished from the main tank is contained. The level sensor detects a liquid level of the ink in the tank main body. The flow restricting part restricts flowing of the ink in an upper-and-lower direction in the tank main body. The flow path is connected to the tank main body at a position below the flow restricting part. The flow restricting part is disposed at a position below a lower limit level of the liquid level.

In accordance with one aspect of the present disclosure, an inkjet recording apparatus includes the sub-tank and a recording head which ejects the ink in the sub-tank to a medium.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
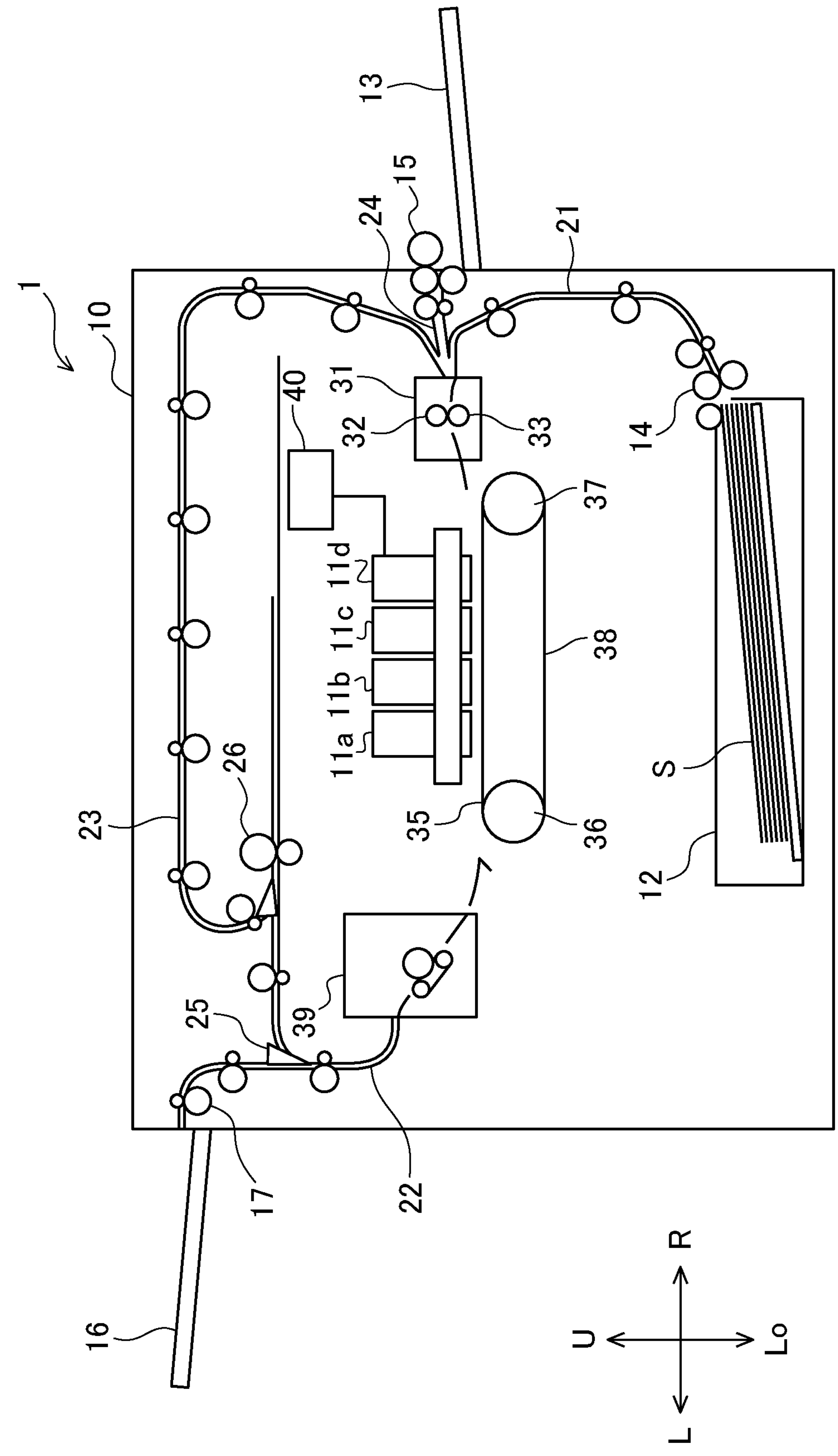
FIG. 1 is a schematic view showing an inkjet recording apparatus according to one embodiment of the present disclosure.

Hereinafter, with reference to the drawings, an inkjet recording apparatus according to the present embodiment will be described. FIG. 1 is a schematic view showing the inkjet recording apparatus according to the embodiment. For convenience of explanation, the front side of the paper plane on which FIG. 1 is drawn is defined as the front side of the inkjet recording apparatus, and the left-and-right direction is described with reference to the direction in which the inkjet recording apparatus is viewed from the front side. Arrows L, R, U, Lo, Fr and Rr appropriately attached to each drawing indicate the left side, right side, upper side, lower side, front side and rear side of the inkjet recording apparatus, respectively.

As shown in FIG. 1, the inkjet recording apparatus 1 is configured to eject ink from inkjet recording heads 11*a*-11*d* toward a sheet S and to preform single-sided printing and double-sided printing for the sheet S. The inkjet recording apparatus 1 includes a box-shaped housing 10 in which various devices are housed. In the lower portion in the housing 10, a sheet feeding cassette 12 in which the sheet S is set is housed, and a manual sheet feeding tray 13 on which the sheet S is manually set is installed on the right side surface of the housing 10. On the upper portion of the left side surface of the housing 10, a sheet discharge tray 16 on which the recorded sheet S is stacked is installed.

In the right side portion inside the housing 10, a first conveyance path 21 along which the sheet S is conveyed from the sheet feeding cassette 12 toward the recording heads 11*a*-11*d* provided in the center portion inside the housing 10 is formed. A sheet feeding part 14 which feeds the sheet S from the sheet bundle in the sheet feeding cassette 12 is provided in the upstream portion of the first conveyance path 21, and a registration roller device 31 which adjusts a feeding timing of the sheet S is provided in the downstream portion of the first conveyance path 21. A sheet feeding path 24 of the manual sheet feeding tray 13 is connected to the downstream portion of the first conveyance path 21, and a sheet feeding part 15 which feeds the sheet S from the sheet bundle on the manual sheet feeding tray 13 is provided on the sheet feeding path 24 of the manual sheet feeding tray 13.

The registration roller device 31 includes a pair of registration rollers 32 and 33 facing each other in the upper-and-lower direction. On the downstream side of the registration rollers 32 and 33, the recording heads 11*a*-11*d* and a conveyance unit 35 are installed. The registration rollers 32 and 33 correct a skew of the sheet S, and feed the sheet S to the conveyance unit 35 in accordance with an ink ejecting operation by the recording heads 11*a*-11*d*. The recording heads 11*a*-11*d* eject the inks of four colors of black, cyan, magenta and yellow, respectively. To the recording heads 11*a*-11*d*, an ink supplying device 40 in which the inks of the four colors are contained is connected.

The conveyance unit 35 is configured such that a conveyance belt 38 is stretched between tensioning rollers 36 and 37 installed below the recording heads 11*a*-11*d*. On the downstream side of the conveyance unit 35, a decurl device 39 which corrects curl caused on the sheet S by drying the ink is provided. On the downstream side of the decurl device 39, a second conveyance path 22 along which the sheet S is conveyed toward the sheet discharge tray 16 is formed. A branch member 25 for switching a discharge destination of the sheet S is provided in the middle of the second conveyance path 22, and a discharge part 17 which discharges the recorded sheet S to the discharge tray 16 is provided in the downstream portion of the second conveyance path 22.

In the upper portion inside the housing 10, a third conveyance path 23 along which the sheet S is conveyed from the branch member 25 to the registration roller device 31 provided in the downstream portion of the first conveyance path 21 is formed. In the middle of the third conveyance path 23, a sheet inverting part 26 which inverts the sheet S upside down is provided. When the sheet S is conveyed to the third conveyance path 23, the sheet S is switched back by the sheet inverting part 26, and the inverted sheet S is conveyed toward the registration roller device 31. As a result, the sheet S is carried into the recording heads 11*a*-11*d* from the registration rollers 32 and 33 with the back side surface of the sheet S facing upward.

In image recording, the sheet S is fed from the sheet feeding cassette 12 or the manual sheet feeding tray 13 by the sheet feeding parts 14 or 15, and sent to the registration roller device 31. In accordance with the ink ejecting timing, the sheet S is sent from the registration roller device 31 to the conveyance belt 38, and a color image is recorded on the front surface of the sheet S by the recording heads 11*a*-11*d*. In single-sided recording, after the curl generated on the sheet S is corrected by the decurl device 39, the sheet S is conveyed to the sheet discharge part 17 through the second conveyance path 22, and the sheet S on which the image is recorded on the front surface is discharged to the sheet discharge tray 16 by the sheet discharge part 17.

In double-sided recording, after the curl generated on the sheet S is corrected by the decurl device 39, the sheet S on which the image is recorded on the front surface is inverted upside down by the third conveyance path 23, and the sheet S is conveyed again toward the registration roller device 31. The sheet S is sent from the registration roller device 31 to the conveyance belt 38, and the image is recorded on the back surface of the sheet S by the recording heads 11*a*-11*d*. Then, after the curl generated on the sheet S is corrected by the decurl device 39, the sheet S is conveyed to the sheet discharge part 17 through the second conveyance path 22, and the sheet S with the images recorded on both the surfaces is discharged to the sheet discharge tray 16 by the sheet discharge part 17.

Incidentally, the inks are supplied to the recording heads 11*a*-11*d* from the ink supplying device 40. In a general ink supplying device, the ink is replenished from a main tank such as an ink cartridge to a sub-tank, and then the ink is supplied from the sub-tank to the recording head according to the ejecting operation of the recording head. In the sub-tank, a liquid surface of the ink touches air, and dissolution of the air in the ink progresses. If the ink having a large amount of dissolved air is supplied from the sub-tank to the recording head, the nozzles of the recording head may be clogged. Although a filter is provided in the flow path of the recording head, it is difficult to reduce the amount of dissolved air in the ink by the filter in the flow path.

Furthermore, a water-repellent or water-resistant medium such as a packaging film and a coated sheet may be used in addition to a plain paper. In such a case, compared with the ink used for a plain paper, the ink containing a larger amount of a high volatile liquid component is used, and the ink may be thickened owing to the volatilization of the liquid component in the sub-tank. In the sub-tank, a liquid surface of the ink touches air, and viscosity of the ink is increased. If the high viscosity ink or a solid material generated by crystalizing the ink is suppled from the sub-tank to the recording head, the nozzles of the recording head may be clogged. Although the solid material may be removed by the filter provided in the flow path of the recording head, it is difficult to reduce the viscosity of the ink.

As described above, the air dissolution in the ink and the thickening of the ink progress near the liquid surface while they are suppressed near the bottom surface of the tank. Therefore, the sub-tank 50 of the present embodiment is provided with a filter 66 as a flow restricting part which restricts flowing of the ink in the upper-and-lower direction in the tank main body. The filter 66 is disposed so as to divide the inside of the tank in the upper-and-lower direction (see FIG. 2) such that it becomes difficult to mix the ink having a large amount of dissolved air near the liquid surface with the ink having a small amount of dissolved air near the bottom surface. Furthermore, when the ink thickened by volatilization of the liquid component is used, the high viscosity ink near the liquid surface is hardly mixed with the low viscosity ink near the bottom surface. By supplying the ink having a small amount of dissolved air or the low viscosity ink to the recording head, the clogging of the nozzles can be suppressed.

Figure 2:
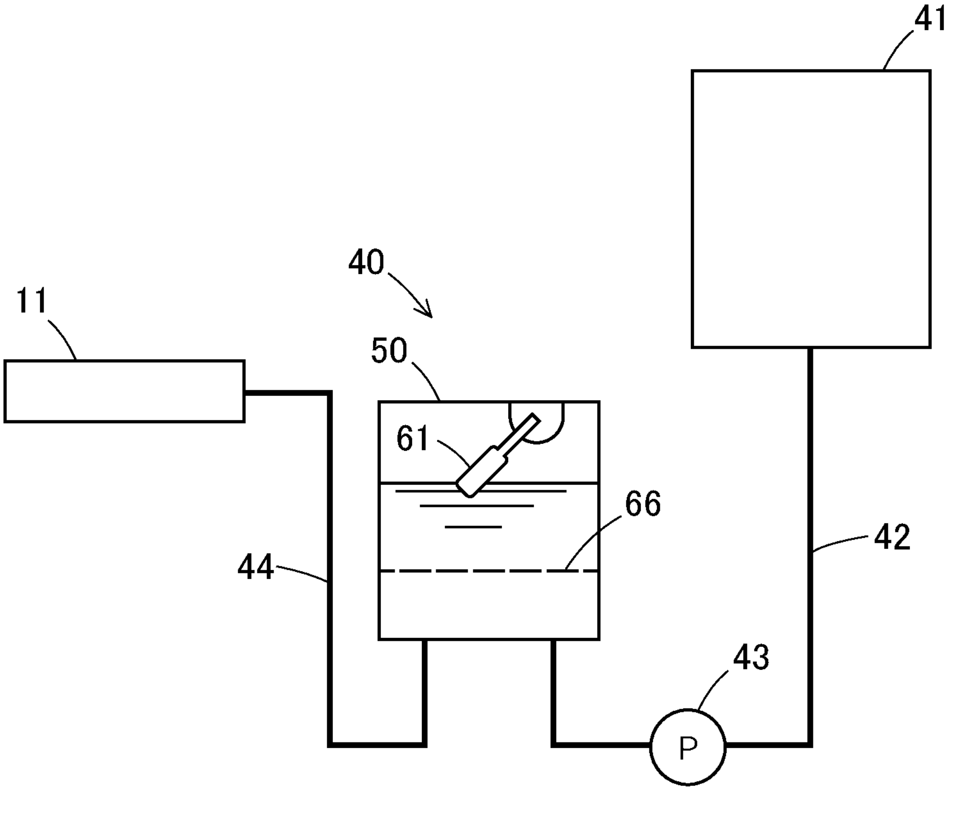
FIG. 2 is a schematic view showing an ink supplying device according to the embodiment of the present disclosure.
Figure 3:
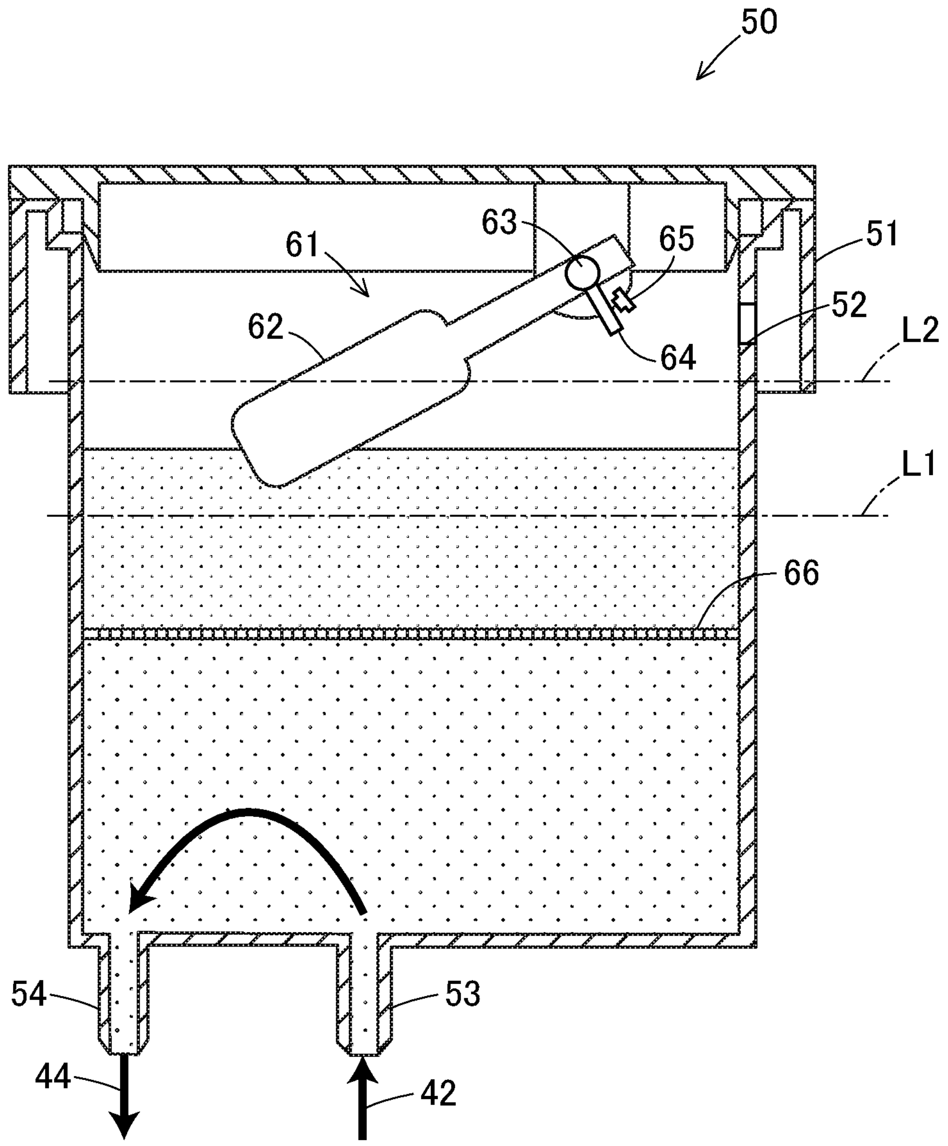
FIG. 3 is a schematic sectional view showing a sub-tank according to the embodiment of the present disclosure.

With reference to FIG. 2 and FIG. 3, the ink supplying device according to the present embodiment will be described. FIG. 2 is a schematic view showing the ink supplying device according to the embodiment. FIG. 3 is a schematic sectional view showing the sub-tank according to the embodiment. The ink supplying device is provided with components such as the tanks corresponding to the recording heads of the colors, but only the components corresponding to the recording head of one color are shown here for convenience of explanation.

As shown in FIG. 2, the ink supplying device 40 is configured such that the ink contained in the main tank 41 is replenished to the sub-tank 50, a water head pressure of the ink is adjusted in the sub-tank 50 and then the ink is supplied to the recording head 11. The main tank 41 is an ink pack or ink cartridge which is detachable from the inkjet recording apparatus 1. The main tank 41 is filled with the deaerated ink, and the ink is supplied from the main tank 41 to the sub-tank 50 through a replenishment path (a flow path) 42. In the middle of the replenishment path 42, a replenishment pump 43 is provided to pump the ink from the main tank 41 to the sub-tank 50.

The sub-tank 50 contains the ink such that the liquid level is lower than the ejection surface of the recording head 11 so that negative pressure acts on the recording head 11. Every time the ink is ejected from the recording head 11, the ink is supplied from the sub-tank 50 to the recording head 11 through a supply path (a flow path) 44. The sub-tank 50 is provided with a float type level sensor 61, and the level sensor 61 detects the liquid level of the ink in the sub-tank 50. When the liquid level is lower than a lower limit level, the replenishment pump 43 is driven to replenish a predetermined amount of the ink from the main tank 41 to the sub-tank 50.

As shown in FIG. 3, the sub-tank 50 is arranged on the flow path from the main tank 41 to the recording head 11. The ink replenished from the main tank 41 is contained in a tank main body 51 of the sub-tank 50. An air opening 52 connecting the inside and outside of the tank is formed in the upper portion of the side wall of the tank main body 51. In the bottom wall of the tank main body 51, an inflow connector 53 having an inflow port and an outflow connector 54 having an outflow port are formed. The replenishment path 42 extending from the main tank 41 is connected to the inflow connector 53, and a supply path 44 toward the recording head 11 is connected to the outflow connector 54.

In the upper portion of the tank main body 51, the float type level sensor 61 is provided to detect the liquid surface of the ink. A float 62 of the level sensor 61 is turnably supported by the upper wall of the tank main body 51. A turning shaft 63 of the float 62 is provided with an operating lever 64, and the operating lever 64 is turned to turn on or off a switch 65 of the level sensor 61. When the float 62 is above the lower limit level L1 of the liquid level, the switch 65 is kept off. When the float 62 is lowered to the lower limit level L1 of the liquid level, the switch 65 is switched from off to on by the operating lever 64.

In the tank main body 51, the filter 66 is arranged to divide the inside of the tank main body 51 in the upper-and-lower direction. As the filter 66, a porous filter is used, which is difficult to pass the ink having a large amount of dissolved air, the high viscosity ink and the solid material generated by crystallizing the ink. The filter 66 is positioned below the lower limit level L1 of the liquid level. Near the liquid surface of the ink above the filter 66, the air dissolution and the ink thickening are progressed, and the amount of dissolved air and the viscosity of the ink are thus increased. Near the bottom surface of the tank below the filter 66, the air dissolution and the ink thickening are not progressed, and the amount of dissolved air and the viscosity of the ink are not increased.

The filter 66 separates the ink into the ink having a large amount of dissolved air and the ink having a small amount of dissolved air, making it difficult to mix the ink having a large amount of dissolved air with the ink having a small amount of dissolved air in the tank main body 51. The filter 66 also makes it difficult to mix the high viscosity ink with the low viscosity ink. The replenishment path 42 and the supply path 44 are connected to the tank main body 51 at positions lower than the filter 66, and the amount of dissolved air and the viscosity of the ink in the supply path 44 toward the recording head 11 are kept low to prevent clogging of the nozzles of the recording head 11. Even if the ink may be crystallized by the thickening, the solid material of the ink is removed by the filter 66.

As described above, in the sub-tank 50 of the present embodiment, the filter 66 is not installed to divide the tank main body 51 into the upstream side (the inflow port side) and the downstream side (the outflow port side), but is installed to divide the tank main body 51 into the upper side and the lower side. This prevents the ink having a large amount of dissolved air or the high viscosity ink from diffusing in the tank main body 51. In addition, the turning shaft 63 of the float 62 of the level sensor 61 is positioned higher than the upper limit level L2 of the liquid level of the ink. Therefore, the thickened ink does not stick to the turning shaft 63 of the float 62, and detection failure of the level sensor 61 due to the sticking of the ink can be prevented. Furthermore, the operating lever 64 and the switch 65 of the level sensor 61 are also positioned higher than the upper limit level L2 of the liquid level of the ink. Therefore, the thickened ink does not stick to the turning shaft 63 of the float 62, and detection failure of the level sensor 61 due to the sticking of the ink can be prevented.

Accordingly, according to the present embodiment, since the filter 66 is positioned lower than the lower limit level L1 of the liquid level, the ink in the tank main body 51 is separated by the filter 66 in the upper-and-lower direction. Above the filter 66, the liquid surface of the ink touches the air, and the air dissolution in the ink is progressed, but below the filter 66, the fresh ink is replenished from the main tank 41 through the replenishment path 42. The filter 66 separates the ink having a large amount of dissolved air from the ink having a small amount of dissolved air, making it difficult to mix the ink having a large amount of dissolved air with the ink having a small amount of dissolved air in the tank main body 51. The amount of dissolved air in the ink in the flow path toward the recording head 11 is kept low to prevent the clogging of the nozzles of the recording head 11. In a case where the air opening 52 is opened in the tank main body 51 as in the present embodiment, the liquid component volatilized from the ink may flow out to the outside of the tank main body 51. This results in more volatilization of the liquid components from the ink surface. In such a case, the effectiveness of taking the above measures becomes greater.

Furthermore, above the filter 66, the liquid surface of the ink touches the air and the ink is thickened due to the volatilization of the liquid component, but, below the filter 66, the low viscosity ink is replenished from the main tank 41 through the replenishment path 42. The high viscosity ink and the low viscosity ink are separated by the filter 66, making it difficult to mix the high viscosity ink with the low viscosity ink in the tank main body 51. The viscosity of the ink in the flow path toward the recording head 11 is kept low to prevent the clogging of the nozzles of the recording head 11.

Furthermore, by applying the sub-tank 50 of this embodiment to the inkjet recording apparatus 1 (see FIG. 1), printing failure on the sheet S can be prevented.

While the ink containing a large amount of the high volatile liquid component is used in the above embodiment, an ink containing a small amount of the high volatile liquid component may be used. In this case, a sub-tank of a modified example 1 shown in FIG. 4 may be used. The sub-tank of the modified example 1 differs from the sub-tank of the above embodiment in that the float of the level sensor moves in the upper-and-lower direction. Therefore, in the modified example 1, the same configurations as those of the above embodiment are not described.

Figure 4:
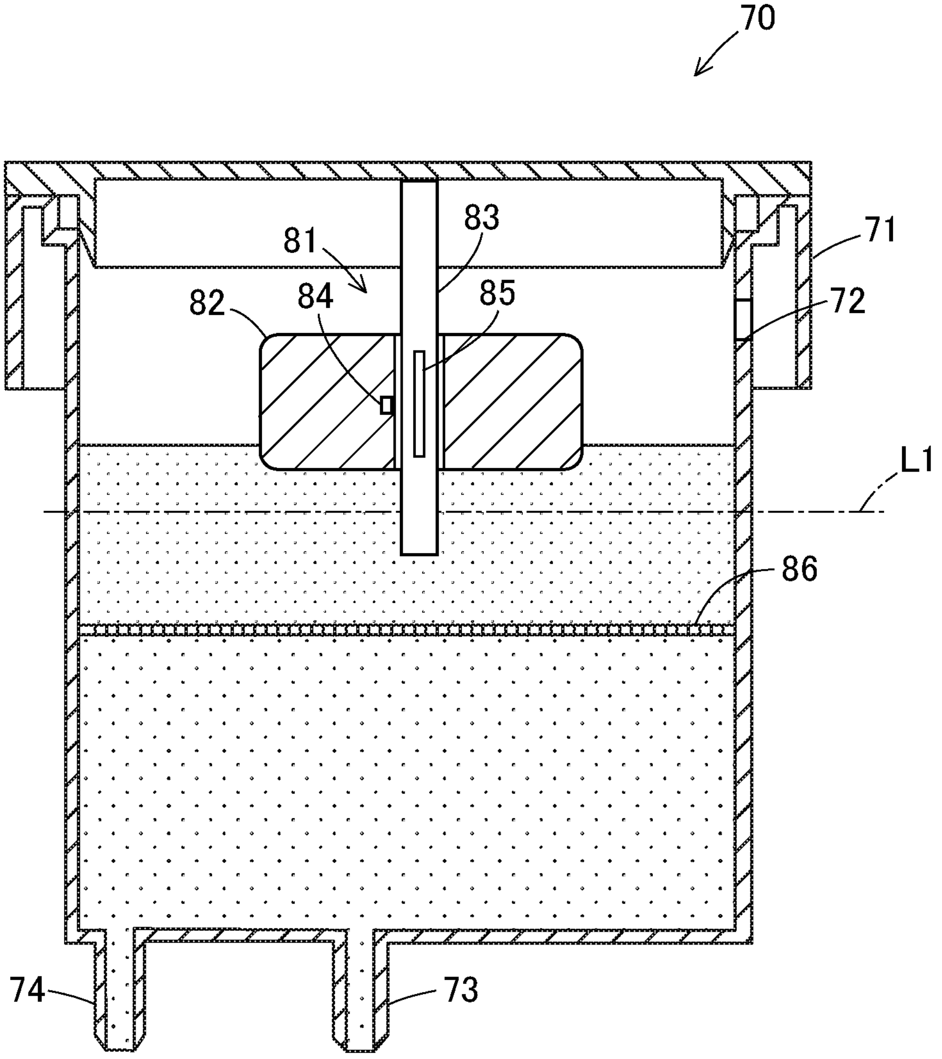
FIG. 4 is a schematic sectional view showing the sub-tank according to a modified example 1.

As shown in FIG. 4, a tank main body 71 of a sub-tank 70 has an air opening 72 connecting the inside and outside of the tank. In the bottom wall of the tank main body 71, an inflow connector 73 having an inflow port and an outflow connector 74 having an outflow port are formed. In the upper portion of the tank main body 71, a float type level sensor 81 is provided. A float 82 of the level sensor 81 is formed into a cylindrical shape, and a slide shaft 83 extending downward from the upper wall of the tank main body 71 is inserted into the center portion of the float 82. The float 82 is moved upward and downward along the slide shaft 83 depending on the liquid level of the ink.

On the inner surface of the float 82, a magnet 84 is provided, and the slide shaft 83 is provided with a switch 85 operating according to upward and downward moving of the magnet 84. When the float 82 is above the lower limit level L1 of the liquid level, the switch 85 is kept off. When the float 82 is lowered to the lower limit level L1 of the liquid level, the magnet 84 switches the switch 85 from off to on. The tank main body 71 includes a filter 86 disposed below the lower limit level L1 of the liquid level, and the filter 86 divides the inside of the tank main body 71 in the upward-and-lower direction.

In the modified example 1, as in the above embodiment, the amount of dissolved air in the ink in the flow path toward the recording head is kept low to prevent the clogging of the nozzles of the recording head. In addition, in the modified example 1, although the slide shaft 83 is inserted into the ink, since the amount of the high volatile liquid component is small, the thickening of the ink is difficult to progress. Therefore, the thickened ink does not stick to the slide shaft 83, and detection failure of the level sensor 81 due to the ink sticking is difficult to occur.

Figure 5:
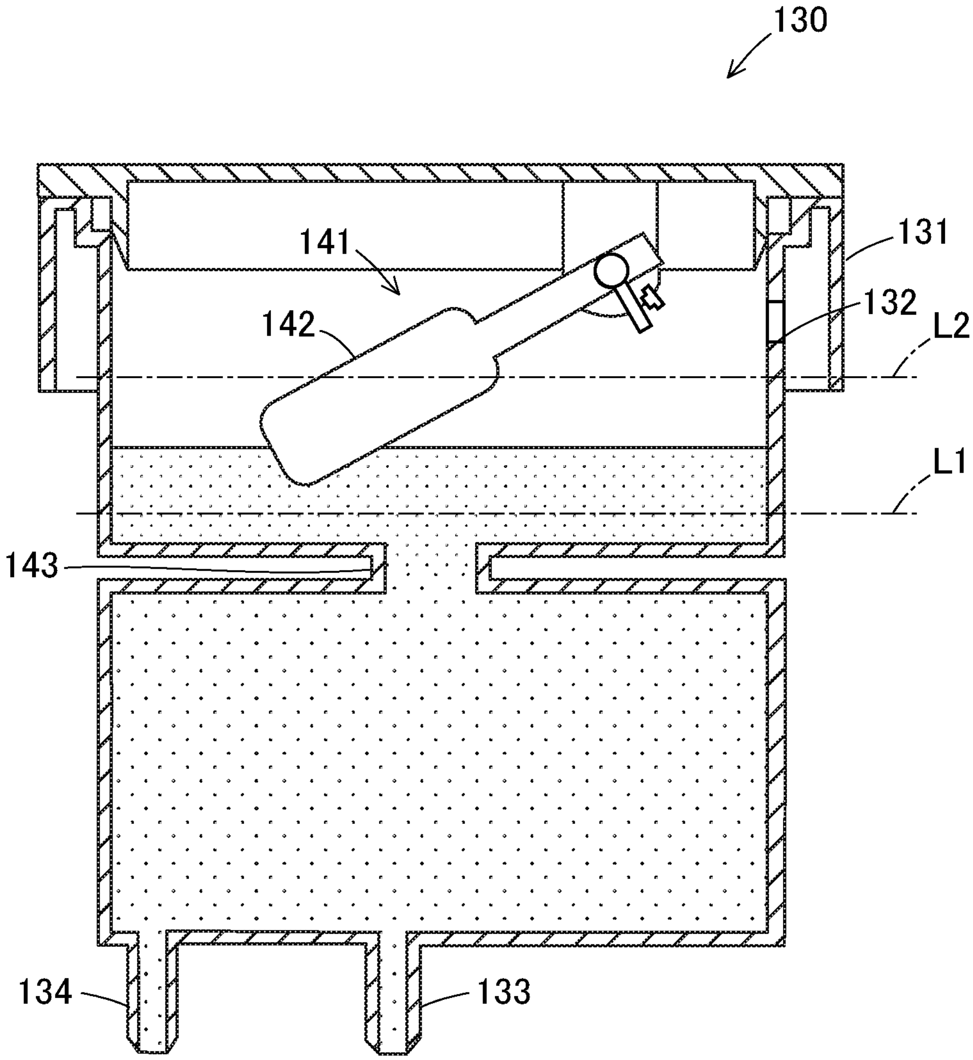
FIG. 5 is a schematic sectional view showing the sub-tank according to a modified example 2.

In addition, as shown in the modified example 2 shown in FIG. 5, a narrowed portion may be formed in the tank main body as the flow restricting part. The sub-tank of the modified example 2 differs from the sub-tank of the above embodiment in that the narrowed portion is formed instead of the filter. Therefore, in the modified example 2, the same configurations as those of the above embodiment are not described.

As shown in FIG. 5, a tank main body 131 of a sub-tank 130 has an air opening 132 connecting the inside and outside of the tank. In the bottom wall of the tank main body 131, an inflow connector 133 having an inflow port and an outflow connector 134 having an outflow port are formed. In the upper portion of the tank main body 131, a float type level sensor 141 is provided. The liquid level of the ink is detected by a height of a float 142 of the level sensor 141. In the tank main body 131, a narrowed portion 143 is formed below the lower limit level L1 of the liquid level to restrict flowing of the ink.

The cross-sectional area of the narrowed portion 143 is smaller than the cross-sectional area of the tank main body 131 above the narrowed portion 143 and the cross-sectional area of the tank main body 131 below the narrowed portion 143. Specifically, the cross-sectional area of the narrowed portion 143 is formed to be at least 0.8 times or less, preferably 0.5 times or less, and more preferably 0.1 times or less the cross-sectional area of the tank main body 131 above the narrowed portion 143 and the cross-sectional area of the tank main body 131 below the narrowed portion 143. Thus, flowing of the ink in the tank main body 131 can be restricted by the narrowed portion 143. In addition, if the cross-sectional area of the narrowed portion 143 is 0.01 times or more the cross-sectional area of the tank main body 131 above the narrowed portion 143 and the cross-sectional area of the tank main body 131 below the narrowed portion 143, clogging of the ink at the narrowed portion 143 can be suppressed.

If the volume of the narrowed portion 143 is less than or equal to the volume between the upper limit level L2 and the lower limit level L1 of the liquid level of the tank main body 131, even if the amount of ink in the tank main body 131 increases or decreases, it becomes difficult to mix the ink above the narrowed portion 143 with the ink below the narrowed portion 143. The volume of the narrowed portion 143 may be 0.5 times or less the volume between the upper limit level L2 and the lower limit level L1 of the liquid level of the tank main body 131.

In the modified example 2, as in the above embodiment, the amount of dissolved air and the viscosity of the ink in the flow path toward the recording head are kept low to prevent the clogging of the nozzles of the recording head.

Figure 6:
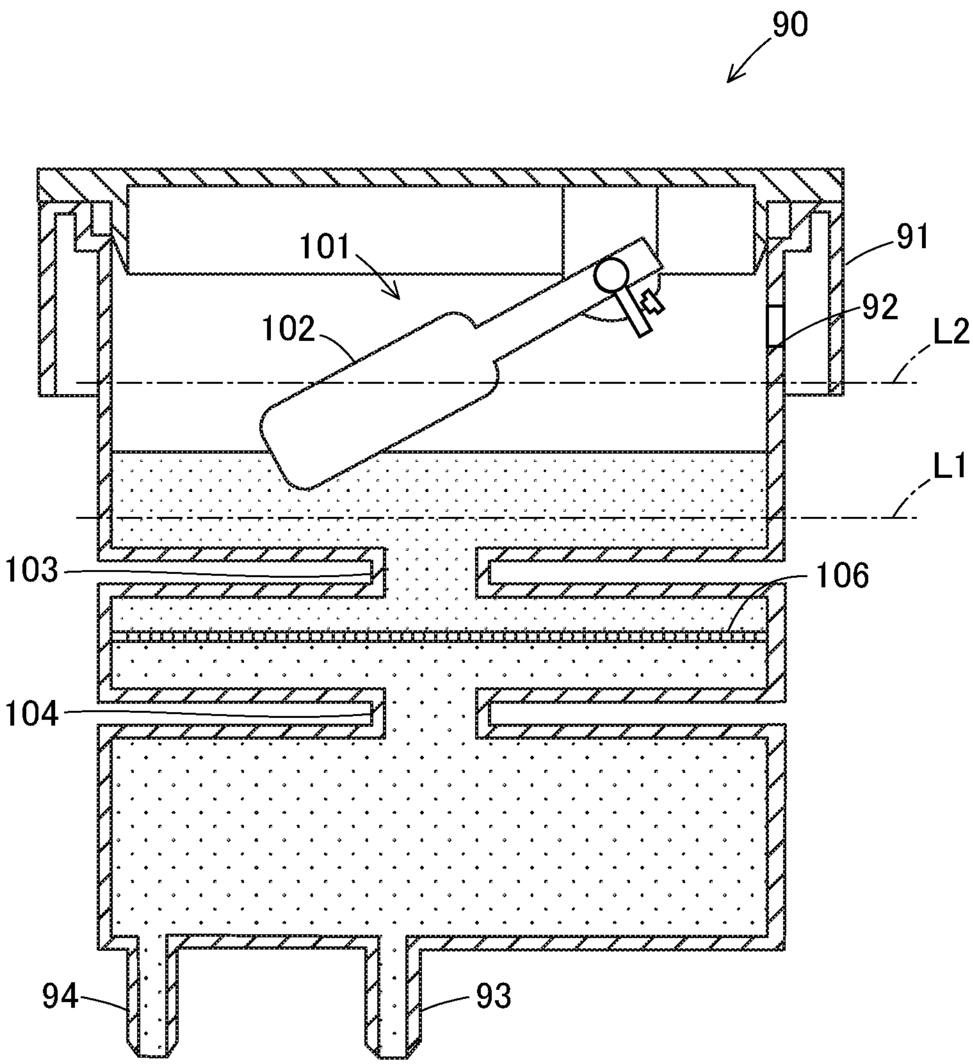
FIG. 6 is a schematic sectional view showing the sub-tank according to a modified example 3.

As shown in the modified example 3 shown in FIG. 6, a narrowed portion may be formed in the tank main body and a filter may be installed. The sub-tank in the modified example 3 differs from the above embodiment in that the narrowed portion is formed in the tank main body and filter is installed. Therefore, in the modified example 3, the same configurations as those of the above embodiment are not described.

As shown in FIG. 6, a tank main body 91 of a sub-tank 90 has an air opening 92 connecting the inside and outside of the tank. In the bottom wall of the tank main body 91, an inflow connector 93 having an inflow port and an outflow connector 94 having an outflow port are formed. In the upper portion of the tank main body 91, a float type level sensor 101 is provided. The liquid level of the ink is detected depending on a height of a float 102 of the level sensor 101. In the tank main body 91, a filter 106 is disposed below the lower limit level L1 of the liquid level, and the filter 106 divides the inside of the tank main body 91 in the upper-and-lower direction.

The tank main body 91 has a first narrowed portion 103 between the lower limit level L1 of the liquid level and the filter 106 to restrict flowing of the ink. The tank main body 91 has a second narrowed portion 104 between the filter 106, and the inflow connector 93 and the outflow connector 94 (the connected portion of the flow paths) to restrict flowing of the ink. The first and second narrowed portions 103 and 104 restrict flowing of the ink across the filter 106 in the upper-and-lower direction. By providing the filter 106 in the tank main body 91 and restricting flowing of the ink due to the first and second narrowed portions 103 and 104, it becomes difficult to mix the ink having a large amount of dissolved air and the high viscosity ink with the ink having a small amount of dissolved air and the low viscosity ink in the tank main body 91.

Specifically, the cross-sectional area of the first narrowed portion 103 may be formed to be at least 0.8 times or less, preferably 0.5 times or less, and more preferably 0.1 times or less the cross-sectional area of the tank main body 91 above the first narrowed portion 103 and the cross-sectional area of the tank main body 91 below the first narrowed portion 103. In the same manner, the cross-sectional area of the second narrowed portion 104 may be formed to be at least 0.8 times or less, preferably 0.5 times or less, and more preferably 0.1 times or less the cross-sectional area of the tank main body 91 above the second narrowed portion 104 and the cross-sectional area of the tank main body 91 below the second narrowed portion 104.

If the volume of the first and second narrowed portions 103 and 104 is less than or equal to the volume between the upper limit level L2 and the lower limit level L1 of the liquid level of the tank main body 91, even if the amount of the ink in the tank main body 91 increases or decreases, it becomes difficult to mix the ink above the first and second narrowed portions 103 and 104 with the ink below the first and second narrowed portions 103 and 104. The volume of the first and second narrowed portions 103 and 104 may be 0.5 times or less the volume between the upper limit level L2 and the lower limit level L1 of the liquid level of the tank main body 91.

In the modified example 3, as in the above embodiment, the amount of dissolved air and the viscosity of the ink in the flow path toward the recording head are kept low to prevent the clogging of the nozzles of the recording head. In the modified example 3, the tank main body 91 has the first and second narrowed portions 103 and 104, however, the tank main body 91 may have at least one of the first and second narrowed portions 103 and 104.

Figure 7:
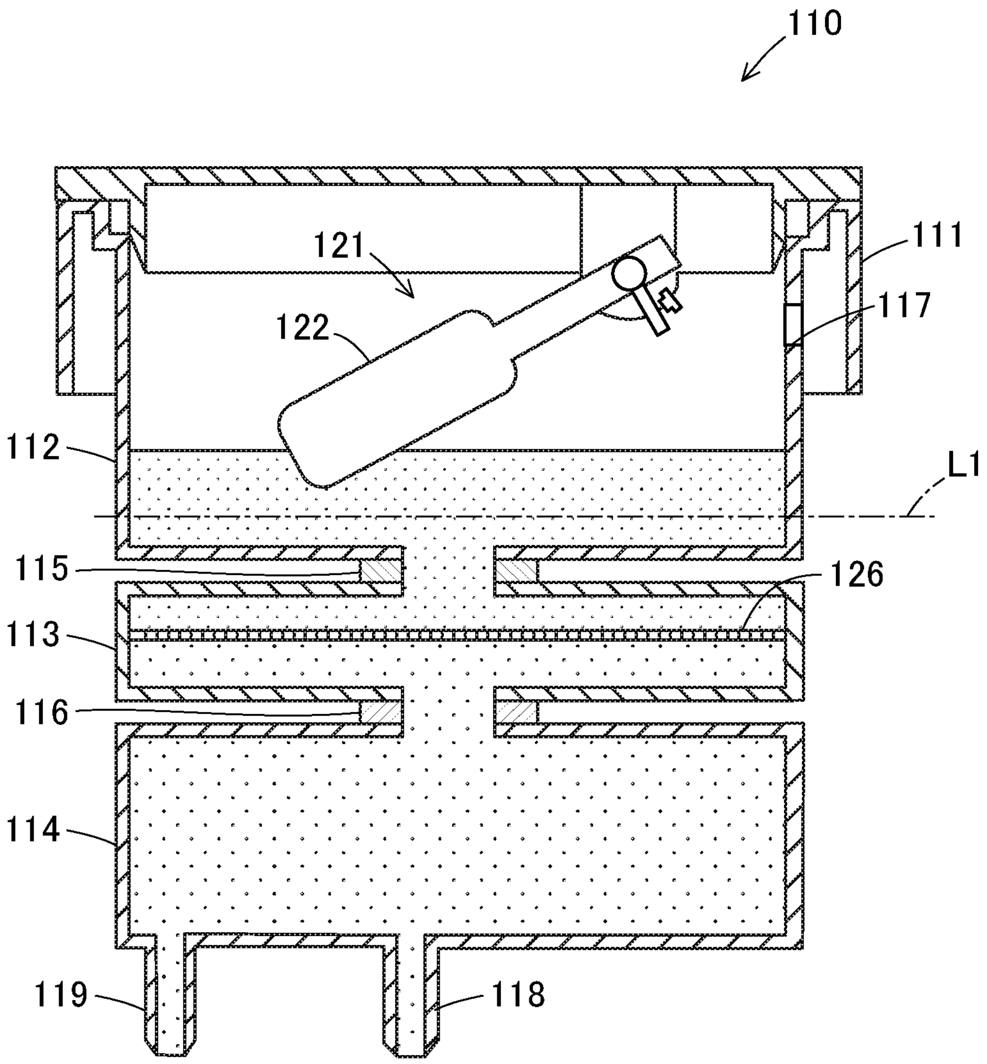
FIG. 7 is a schematic sectional view showing the sub-tank according to a modified example 4.

As shown in the modified example 4 of FIG. 7, the tank main body may be formed by a plurality of members. The sub-tank of the modified example 4 differs from the sub-tank of the above embodiment in that the tank main body is formed by the plurality of members. Therefore, in the modified example 4, the same configurations as those of the above embodiment are not described.

As shown in FIG. 7, a tank main body 111 of a sub-tank 110 includes a first tank 112 in which the liquid level is detected, a second tank 113 in which a filter 126 is disposed, and a third tank 114 to and from which the ink is supplied and discharged through flow paths. The first and second tanks 112 and 113 are connected by a first tube member 115, and the second and third tanks 113 and 114 are connected by a second tube member 116. The first tank 112 has an air opening 117 connecting the inside and outside of the tank. The first tank 112 is provided with a float type level sensor 121. The liquid level of the ink is detected depending on a height of a float 122 of the level sensor 121.

In the second tank 113, a filter 126 is disposed below the lower limit level L1 of the liquid level, and the filter 126 divides the inside of the second tank 113 in the upper-and-lower direction. The third tank 114 includes an inflow connector 118 having an inflow port and an outflow connector 119 having an outflow port. The first tube member 115 restricts flowing of the ink between the first and second tanks 112 and 113, and the second tube member 116 restricts flowing of the ink between the second and third tanks 113 and 114. By providing the filter 126 in the second tank 113 and restricting flowing of the ink by the first and second tube members 115 and 116, it becomes difficult to mix the ink having a large amount of dissolved air and the high viscosity ink with the ink having a small amount of dissolved air and the low viscosity ink in the tank main body 111.

In the modified example 4, in the same manner as the above embodiment, an amount of the dissolved air and a viscosity of the ink in the flow path toward the recording head are kept low to prevent the clogging of the nozzles of the recording head. In the modified example 4, the first tank 112 is connected to the second tank 113 by one tube member, but, the first tank 112 may be connected to the second tank 113 by two or more tube members. In addition, the second tank 113 is connected to the third tank 114 by one tube member, but, the second tank 113 may be connected to the third tank 114 by two or more tube members.

In the above embodiment and the modified example, the float type level sensors are used, but, a fixing type sensor such as a photosensor, an electrostatic sensor and a needle electrode may be used.

In the above embodiment and the modified examples, the lower limit level of the liquid level of the ink is detected by the level sensor, but the level sensor may detect the liquid level of the ink linearly.

In the present embodiment, the medium may be an object on which an image is to be formed, such as a plain paper, a coated paper, a tracing paper or an OHP (Over Head Projector) sheet.

The present embodiment is described, but as another embodiment, the above embodiment and the modified examples may be wholly or partially combined.

In addition, the technology of the present disclosure is not limited to the above embodiment and may be changed, replaced or modified in various ways without departing from the purpose of the technical idea. Furthermore, if technological ideas can be realized in a different way by technological progress or a derived different technology, they may be implemented using that method. Thus, the claims cover all possible embodiments within the scope of technical thought.

The invention claimed is:

1. A sub-tank disposed in a flow path from a main tank to a recording head, the sub-tank comprising:

a tank main body in which ink replenished from the main tank is contained;

a level sensor which detects a liquid level of the ink in the tank main body; and a flow restricting part which restricts flowing of the ink in an upper-and-lower direction in the tank main body, wherein the flow path is connected to the tank main body at a position below the flow restricting part, the flow restricting part is disposed at a position below a lower limit level of the liquid level, and the tank main body includes a first tank in which the liquid level is detected, a second tank in which the flow restricting part is disposed, a third tank to and from which the ink is suppled and discharged, and a plurality of tube members which connects the first tank, the second tank and the third tank.

2. The sub-tank according to claim 1, wherein the ink is thickened by volatilization of a liquid component of the ink.

3. The sub-tank according to claim 1, wherein the tank main body has an air opening.

4. The sub-tank according to claim 2, wherein the level sensor has a float turnably supported by the tank main body, and a turning shaft of the float is disposed above an upper limit level of the liquid level.

5. The sub-tank according to claim 1, wherein the flow restricting part is a filter disposed so as to divide an inside of the tank main body in the an upper-and-lower direction.

6. The sub-tank according to claim 5, wherein the tank main body includes a narrowed portion which restricts the flowing of the ink in at least one of between the lower limit level of the liquid level and the filter and between the filter and a connection portion of the flow path.

7. The sub-tank according to claim 1, wherein the flow restricting part is a narrowed portion, and a cross-sectional area of the narrowed portion is smaller than those of portions above and below the narrowed portion.

8. The sub-tank according to claim 1, wherein the level sensor has a slide shaft extending downward from an upper wall of the tank main body and a float moving upward and downward along the slide shaft, and the slide shaft is inserted into the ink.

9. An inkjet recording apparatus comprising:

the sub-tank according to claim 1; and a recording head which ejects the ink in the sub-tank to a medium.

* * * * *